Figure 1:
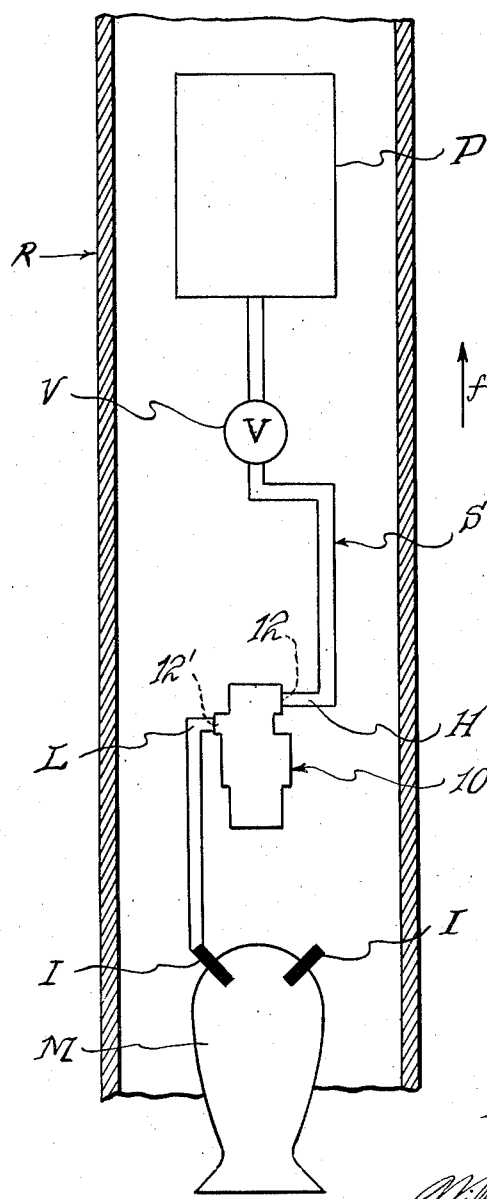

April 8, 1958     H. KLEINMAN     2,829,492
TEMPERATURE COMPENSATED REGULATOR FOR FLUID SUPPLY LINES
Filed Feb. 28, 1955     2 Sheets-Sheet 1

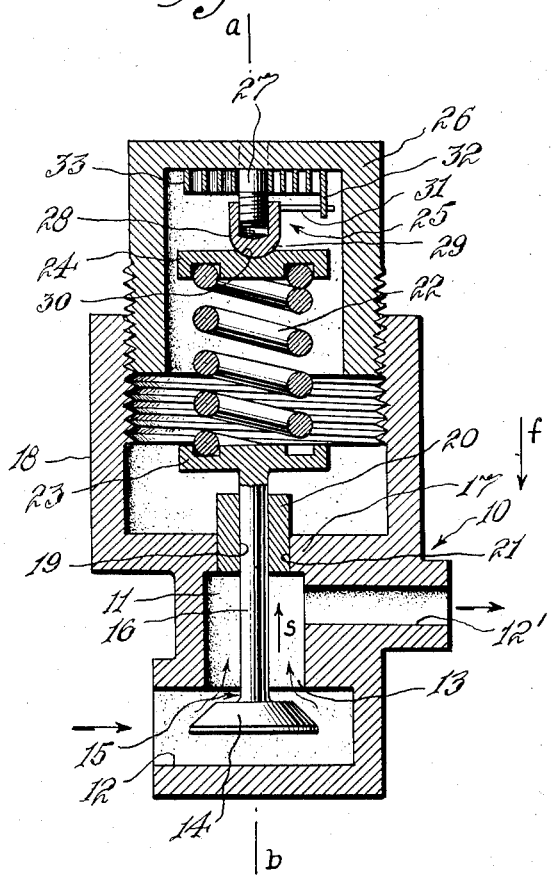

United States Patent Office 2,829,492
Patented Apr. 8, 1958

2,829,492

TEMPERATURE COMPENSATED REGULATOR FOR FLUID SUPPLY LINES

Harold Kleinman, New York, N. Y., assignor to Reaction Motors, Inc., Rockaway, N. J., a corporation of New Jersey Application February 28, 1955, Serial No. 490,827

5 Claims. (Cl. 60—35.6)

This invention relates to temperature compensated regulators for controlling the flow and delivery pressure of fluids in supply lines and has particular reference to an improved regulator of high sensitivity, efficiency and structural simplicity and compactness which is peculiarly adapted for use in connection with the propellant supply systems of self-propelled aerial missiles such as rockets.

It may be explained that propellant supply systems of this kind include ground installed apparatus and also individual units located inside the missiles to deliver propellant fluid to the propulsive devices thereof in flight. The improved regulator of the present invention is capable of efficient use in either the ground or the airborne system and its unusual compactness makes it especially desirable in the latter capacity due to the necessity for strict economy in the use of interior space.

Prior to the present invention, the conventional pressure regulator generally incorporated in any propellant supply system has comprised a poppet valve assembly having an orifice through which the propellant fluid flows on its way from a supply tank to the propulsive units of the missile, and also adjustable spring means to bias the valve against the inlet pressure exerted upon it by the propellant. The propellant usually derives its pressure from pressurization of the tank in which it is stored. The design of the conventional regulator is such that it may be set manually to determine the average outlet thrust pressure for a given anticipated ambient temperature range, but in a regulator of this type the valve and its biasing spring are subject to changing operational characteristics, due principally to the effect of variations in ambient temperature on the modulus of elasticity of the spring and on the static friction of the moving components of the valve assembly. Under these conditions, the tendency has been to accept the changing valve characteristics at other than the particular design ambient temperature. In some instances, these changing characteristics have been desirable as they tended to offset the changes in propellant density, combustion efficiency and discharge coefficient of injectors, which factors also are a function of ambient temperature. This counterbalancing effect, when it occurs, will aid in maintaining a constant thrust over a given ambient temperature range. However, it may just as often be the case that these effects do not counterbalance one another, with the result that there will be a much wider thrust variation over a given ambient temperature range than would be expected based only on the propellant density, combustion efficiency and discharge coefficient variations.

With the above-enumerated disadvantages of the prior art pressure regulators in mind, it is the primary object of the present invention to provide a regulator having means to compensate for variations in ambient temperature and thereby produce a specified outlet pressure. A previous knowledge of the propellant density, combustion efficiency and discharge coefficient variations with ambient temperature makes it possible to design a temperature compensator to counterbalance these variations automatically and fully to insure a constant thrust over a given ambient temperature range.

As previously intimated, another important object of the invention is to provide a temperature compensated regulator of extreme structural and operational simplicity and corresponding compactness in order that it may be accommodated to installation inside an aerial missile.

Other objects, advantages and features of the invention will become apparent as the following specific description is read in connection with the accompanying drawings, in which: Fig. 1 is a diagrammatic representation of the propulsion system of a liquid propellant rocket having the temperature compensated regulator of the present invention installed therein; and Fig. 2 is an inverted large scale axial section of the regulator alone.

Referring now in detail to Fig. 2 of the drawing, it will be observed that the regulator includes a valve body 10 which is provided in its base portion with a vertical main chamber 11 of preferably cylindrical form. The lower end of the main chamber opens into a lateral inlet chamber 12 and an outlet chamber 12' extends laterally from the upper end of chamber 11.

As shown in Fig. 1, inlet chamber 12 is connected to the upstream high pressure portion H of the supply line S that leads from liquid propellant tank P through remotely-controlled valve V to body 10 of the regulator. Outlet chamber 12' is connected to the downstream low pressure portion L of the supply line S that leads to injectors I of rocket motor M. Fig. 1 shows the propellant supply system and motor just described installed inside the body of a rocket R.

Referring again to Fig. 2. in particular, it will be observed that at the juncture of main chamber 11 and inlet chamber 12, a circular downwardly facing orifice 13 is formed for operative association with frusto-conical valve member 14 of poppet valve assembly 15, which includes vertical valve stem 16 arranged coaxial to chamber 11 and its orifice 13. Valve stem 16 is mounted for vertical regulatory adjustment in valve body 10 and projects through top wall 17 of the latter into a casing portion 18 of body 10 which is cylindrical in form and arranged concentric to valve stem 16. It is preferred to mount valve stem 16 in the axial bore 19 of a bearing block 20 set in a vertical aperture 21 provided in wall 17 of valve body 10, but any other suitable bearing means may be employed within the spirit of the invention.

The geometrical form of valve member 14 and its operative arrangement in relation to orifice 13 is such that, when fluid pressure is exerted on the large area bottom face of the valve member, the latter will be forced upward and tend to close the orifice or at least reduce the effective cross-sectional area thereof, depending upon the degree of upward movement. In order to counterbalance this valve closing tendency, spring biasing means is provided and preferably is located within casing 18, together with means by which the tension of the biasing means may be manually adjusted.

The valve biasing means and the regulating means therefor may assume several forms, but the structure illustrated in Fig. 2 is preferred due to its simplicity and ease of operation. In this instance, a helical spring 22 of cylindrical form is arranged with its axis concentric to valve stem 16 and is interposed between lower and upper compression caps 23 and 24, respectively. Lower compression cap 23 may be affixed to the upper end of valve stem 16, but it is desirable to swivel upper compression cap 24 in relation to the means which has been selected for adjustment of the spring tension and for temperature compensation designated collectively by the numeral 25. A convenient manipulatable means by which the tension of the biasing spring may be adjusted is the handpiece 26 of cylindrical inverted cup-shape, which has screwthreaded engagement with casing portion 18 of valve body 10. This handpiece is adapted to exert downward thrust upon spring 22 through the medium of an internal thrust rod 27, which depends centrally from the top wall of the handpiece in alignment with valve stem 16, and a thimble-shaped pivot member 28 having screwthreaded connection to thrust rod 27 to permit operative cooperation with the temperature compensator to be described presently and of which the pivot member forms a component part. The lower end of pivot member 28 is provided with a smoothly rounded bearing face 29 for frictional engagement within a central bearing depression 30 of corresponding shape provided in the top face of upper compression cap 24.

In setting the regulator for a predetermined size of orifice, handpiece 26 is rotated in the appropriate direction to increase or decrease the tension of valve biasing spring 22.

The temperature compensating means which has been added to the manual adjustment means for the valve biasing spring may take various forms, but it is preferred to utilize the specific thermostatic element shown in the drawing. To this end, a torque arm 31 is rigidly applied to pivot member 28 and is arranged to project radially therefrom into the path of movement of a vertical stud 32 which depends from the outer free end of flat spiral thermostatic element 33 whose inner end is suitably affixed to thrust rod 27. Thermostatic element 33 should be of such composition and form that an increase in ambient temperature will cause its free end to revolve about the axis of thrust rod 27 in a direction to counterbalance the valve opening effect of ambient heat on biasing spring 22.

The operation of the improved regulator is very simple and effective. Initial manual adjustment of the tension of the valve biasing spring is effected by rotating handpiece 26 in the appropriate direction. Thereafter, compensatory adjustments will be effected automatically as changes in ambient temperature occur through operation of the thermostatic element 33.

When the regulator is installed inside the body R of a rocket (Fig. 1) for regulation of propellant supply during flight, the thermostatic element 33 will be subjected to far more rapid temperature changes than under pre-flight conditions. Consequently, undesired amplitude in compensatory adjustment of poppet valve assembly 15 could occur if it were not for a safety feature which is provided by arranging the regulator with the common axis of valve stem 16 and thrust rod 27 parallel to the flight axis $a$—$b$ of the rocket body (Fig. 2). Due to this arrangement, set-back forces in the direction of arrow $s$ induced in poppet valve assembly 15 by acceleration of the rocket body in flight in the direction of arrow $f$ (the regulator being shown in inverted relation to the actual direction of flight of a rocket in which installed) will drive pivot member 28 axially upward in relation to thrust rod 27 to such a degree and with such force that the mated screw threads of member 28 and rod 27 will become distorted into a locked condition which will insure complete suspension of the temperature compensation effects of thermostatic element 33 throughout the existing conditions of flight velocity acceleration. The thread design should be such that the desired transitory locking distortion will be within the elastic limits of the thread metal under the influence of maximum estimated acceleration so that rupture or metal flow cannot occur.

While there have been shown and described and pointed out the fundamental novel features of this invention as applied to a single structural embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A temperature compensated pressure regulator for fluid supply lines including a high pressure portion and a low pressure portion comprising a valve body having inlet and outlet chambers adapted to be connected to the high and low pressure portions of the line and an intercommunicating flow regulating orifice, a pressure balanced valve member movably related to the flow regulating orifice in a manner to control the effective cross-sectional area thereof, said valve member including a valve stem slidable in the valve body, a rotatable handpiece having screwthreaded engagement with the valve body on an axis concentric with the valve stem, a thrust rod rigid with the handpiece and arranged in alignment wtih the valve stem, a pivot member having screwthreaded engagement with the thrust rod, a valve biasing spring interposed between the valve stem and the said pivot member whereby said spring will be adjusted in tension by rotation of the handpiece, and thermostatic means to rotate the pivot member in response to changes in ambient temperature and thereby further adjust the tension of the valve biasing spring.

2. A temperature compensated pressure regulator as defined in claim 1, wherein the thermostatic element is elongated in form and has one end rigid with the thrust rod of the handpiece and the opposite end connected with the pivot member in a manner to rotate the latter in response to deformation of the said element by changes in ambient temperature.

3. A temperature compensated pressure regulator as defined in claim 1, wherein the thermostatic element is spiral in form and arranged in enclosing relation to the thrust rod of the handpiece with its inner end rigid with said rod, the said element being of a nature whereby changes in ambient temperature will cause its outer free end to revolve around the rod axis, and wherein a stud rigid with the free end of the thermostatic element projects axially therefrom and a radial torque arm projects radially from the pivot member into the path of said stud in a position to be swung about the axis of said pivot member upon revolution of the stud.

4. In combination, a rocket body having a propellant supply system for its propulsion means including a high pressure portion and a low pressure portion, and a temperature compensated pressure regulator for said supply system installed in the rocket body, said regulator including a valve body having inlet and outlet chambers connected to the high and low pressure portions of the propellant supply system and an intercommunicating flow regulating orifice, a pressure balanced valve member movably related to said orifice in a manner to control the effective cross-sectional area thereof, spring means to bias the valve member against the inlet pressure, means by which the tension of the valve biasing spring may be adjusted manually to set the pressure balance condition of the valve member for a predetermined ambient temperature range, compensator means responsive to ambient temperature variations outside the limits of said predetermined range to further bias the valve member, and means mounted for limited movement parallel to the flight axis of the rocket body and being responsive to velocity acceleration of the rocket body in flight to render the temperature compensator means temporarily inoperative in its spring biasing effect.

5. In combination, a rocket body having a propellant supply system for its propulsion means including a high pressure portion and a low pressure portion, and a temperature compensated pressure regulator for said supply system installed in the rocket body, said regulator including a valve body having inlet and outlet chambers connected to the high and low pressure portions of the propellant supply system and an intercommunicating flow regulating orifice, a pressure balanced valve member movably related to said orifice in a manner to control the effective cross-sectional area thereof, said valve member including a valve stem slidable in the valve body, a rotatable handpiece having screwthreaded engagement with the valve body on an axis concentric with the valve stem, a thrust rod rigid with the handpiece and arranged in alignment with the valve stem, a pivot member having screwthreaded engagement with the thrust rod, a valve biasing spring interposed between the valve stem and the pivot member whereby said spring will be adjusted in tension by rotation of the handpiece, and thermostatic means to rotate the pivot member in response to changes in ambient temperature and thereby further adjust the tension of the valve biasing spring, the pressure regulator being arranged in the rocket body with the common axis of the valve stem and thrust rod parallel to the flight axis of said rocket body whereby the threaded connection of the thrust rod and pivot member will be locked by thread distorting action imposed by axial thrust of the valve stem under the influence of set-back forces induced by velocity acceleration of the rocket body in flight.

References Cited in the file of this patent

UNITED STATES PATENTS

| | | |
|---|---|---|
| 342,801 | Maines | June 1, 1886 |
| 569,943 | Shirley | Oct. 20, 1896 |
| 1,662,289 | Whitehead | Mar. 13, 1928 |
| 1,813,122 | Moore | July 7, 1931 |
| 2,415,475 | Eshbaugh | Feb. 11, 1947 |

FOREIGN PATENTS

| | | |
|---|---|---|
| 19,857 | Great Britain | Nov. 4, 1892 |